(12) United States Patent
Felknor

(10) Patent No.: US 9,801,357 B2
(45) Date of Patent: Oct. 31, 2017

(54) HUMMINGBIRD FRUIT FLY FEEDER

(71) Applicant: Joyce Felknor, Knoxville, TN (US)

(72) Inventor: Wilson A. Felknor, Knoxville, TN (US)

(73) Assignee: Stuart T. McFerrin, Knoxville, TN (US)

(*) Notice: Subject to any disclaimer, the term of this patent is extended or adjusted under 35 U.S.C. 154(b) by 170 days.

(21) Appl. No.: 14/756,982

(22) Filed: Nov. 4, 2015

(65) Prior Publication Data
US 2016/0150764 A1 Jun. 2, 2016

Related U.S. Application Data

(60) Provisional application No. 62/123,222, filed on Nov. 10, 2014.

(51) Int. Cl.
*A01K 39/02* (2006.01)

(52) U.S. Cl.
CPC .................. *A01K 39/0206* (2013.01)

(58) Field of Classification Search
CPC .... A01K 39/0206; A01K 39/02; A01K 39/00; A01K 39/04; A01K 39/01; A01K 39/0125; A01K 39/0113; A01K 39/014; A01K 39/012
See application file for complete search history.

(56) References Cited

U.S. PATENT DOCUMENTS

| | | | | |
|---|---|---|---|---|
| 2,591,126 A * | 4/1952 | Breck, Jr. | ............ | A01K 39/012 119/52.2 |
| 5,682,835 A * | 11/1997 | Walter | ............... | A01K 39/0206 119/57.8 |
| 8,347,818 B2 * | 1/2013 | Cowger | ............. | A01K 39/0206 119/72 |
| 2007/0272161 A1* | 11/2007 | Stone | ...................... | A01K 39/02 119/51.01 |
| 2008/0257273 A1* | 10/2008 | Carter | ................ | A01K 39/0206 119/72 |
| 2011/0297095 A1* | 12/2011 | Cruz | ...................... | A01K 39/02 119/80 |
| 2014/0109835 A1* | 4/2014 | Colvin | ............... | A01K 39/0206 119/74 |
| 2014/0158056 A1* | 6/2014 | Vaughn, Jr. | ........ | A01K 39/0206 119/72 |

(Continued)

*Primary Examiner* — Trinh Nguyen
(74) *Attorney, Agent, or Firm* — Michael E. McKee

(57) ABSTRACT

A hummingbird feeder includes a base tray having a receptacle defining an upwardly-opening interior for holding food which is attractive to fruit flies and further includes a top cover which is positionable atop the base tray. The receptacle has a substantially circular opening through which the food is placed into the interior of the receptacle, and the receptacle interior is bordered by upwardly-directed cylindrical walls which encircle the interior. The top cover has a top portion for covering the receptacle interior and a cylindrical portion which extends downwardly from the top portion. The cylindrical portion is accepted by the cylindrical walls of the receptacle when the top cover is placed atop the base tray, and each of the top portion and the cylindrical portions include through-slots which provide a hummingbird with access to the interior of the receptacle.

11 Claims, 3 Drawing Sheets

(56) References Cited

U.S. PATENT DOCUMENTS

| | | | |
|---|---|---|---|
| 2015/0020742 A1* | 1/2015 | Faunce | A01K 39/024 119/78 |
| 2015/0075435 A1* | 3/2015 | Hazel | A01K 39/0113 119/57.9 |
| 2016/0128308 A1* | 5/2016 | Lipford | A01K 39/01 119/72 |
| 2016/0374318 A1* | 12/2016 | Colvin | A01K 39/014 119/74 |
| 2017/0127655 A9* | 5/2017 | Vaughn, Jr. | A01K 39/0206 |

* cited by examiner

HUMMINGBIRD FRUIT FLY FEEDER

The benefit of Provisional Application Ser. No. 62/123,222, filed Nov. 10, 2014, is hereby claimed. The disclosure of this referenced provisional patent application is incorporated herein by reference.

BACKGROUND OF THE INVENTION

This invention relates generally to bird feeders and relates, more particularly, to bird feeders intended for feeding hummingbirds.

It would be desirable to provide a hummingbird feeder capable of holding foodstuff which is attractive to fruit flies which, in turn, are attractive to hummingbirds.

Accordingly, it is an object of the present invention to provide a new and improved hummingbird feeder.

Another object of the present invention is to provide such a feeder having a food-holding interior which is easily accessible to a user.

Still another object of the present invention is to provide such a feeder for holding foodstuff intended to attract fruit flies which, in turn, attract hummingbirds.

Yet another object of the present invention is to provide such a feeder which is esthetically appealing.

A further object of the present invention is to provide such a feeder which possesses openings through which fruit flies can pass for access to foodstuff contained within the feeder but which resists the passage therethrough of insects which are appreciably larger than fruit flies.

A further object of the present invention is to provide such a feeder which is uncomplicated in structure, yet effective in operation.

SUMMARY OF THE INVENTION

This invention resides in a hummingbird feeder including a base tray and a top cover which is positionable upon the base tray. The base tray includes a receptacle having an upwardly-opening interior for holding food which is attractive to fruit flies, and the top cover includes a top portion for covering the upwardly-opening interior of the base tray when the top cover is positioned thereupon and wherein the top portion defines an underside. The top cover further includes a downwardly-extending portion which extends downwardly from the underside of the top cover. In addition, at least one aperture is defined within the downwardly-extending portion of the top cover and is sized to permit a fruit fly to pass therethrough and access fruit fly-attracting food held within the interior of the base tray.

BRIEF DESCRIPTION OF THE DRAWINGS

Further features, aspects and advantages of the present disclosure will become better understood by reference to the following detailed description, appended claims, and accompanying figures, wherein elements are not to scale so as to more clearly show the details, wherein the reference numerals indicate like elements throughout the several views, and wherein:

DETAILED DESCRIPTION OF AN ILLUSTRATIVE EMBODIMENT

Figure 1:
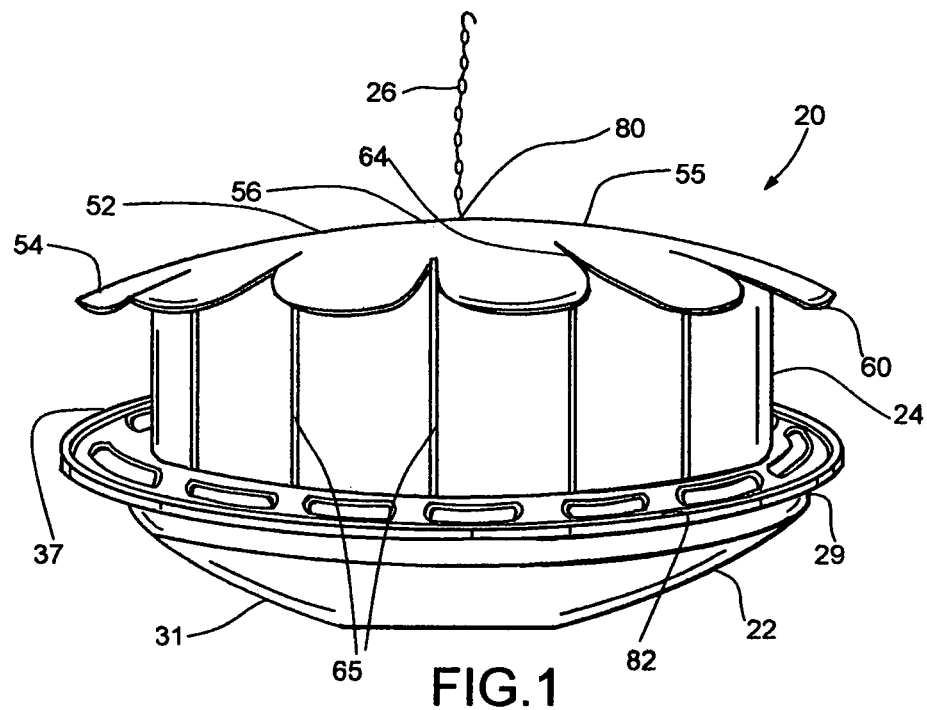
FIG. 1 is a perspective view of an embodiment of a hummingbird feeder within which features of the present invention are embodied.

Turning now to the drawings in greater detail and considering first FIGS. 1-4, there is illustrated an embodiment, generally indicated 20, of a hummingbird feeder within which features of the present invention are embodied. Briefly, the feeder 20 is of two-piece construction including a base tray 22 which is adapted to hold food intended to attract fruit flies and a top cover 24 which is positionable atop so as to cover the base tray 22. With the top cover 24 positioned upon the base tray 24 to form the assembled feeder 20, the feeder 20 can be suspended with a chain 26 (or other tension-bearing material, such as a cord or wire) from an overhanging structure (not shown).

Figure 2:
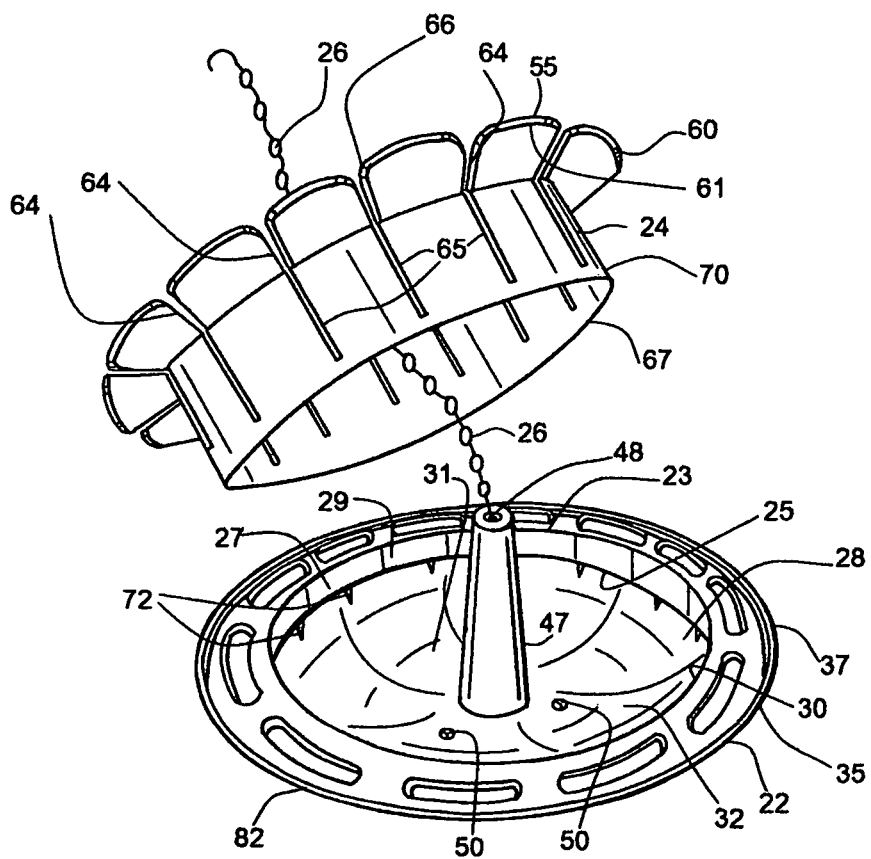
FIG. 2 is a perspective view of the FIG. 1 embodiment, shown exploded.
Figure 3:
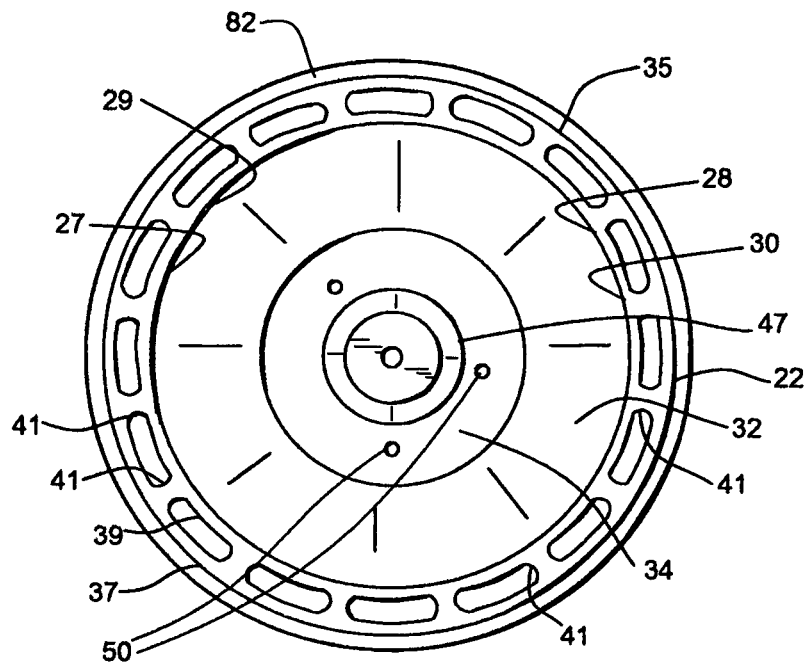
FIG. 3 is a top plan view of the base tray of the FIG. 1 embodiment.
Figure 4:
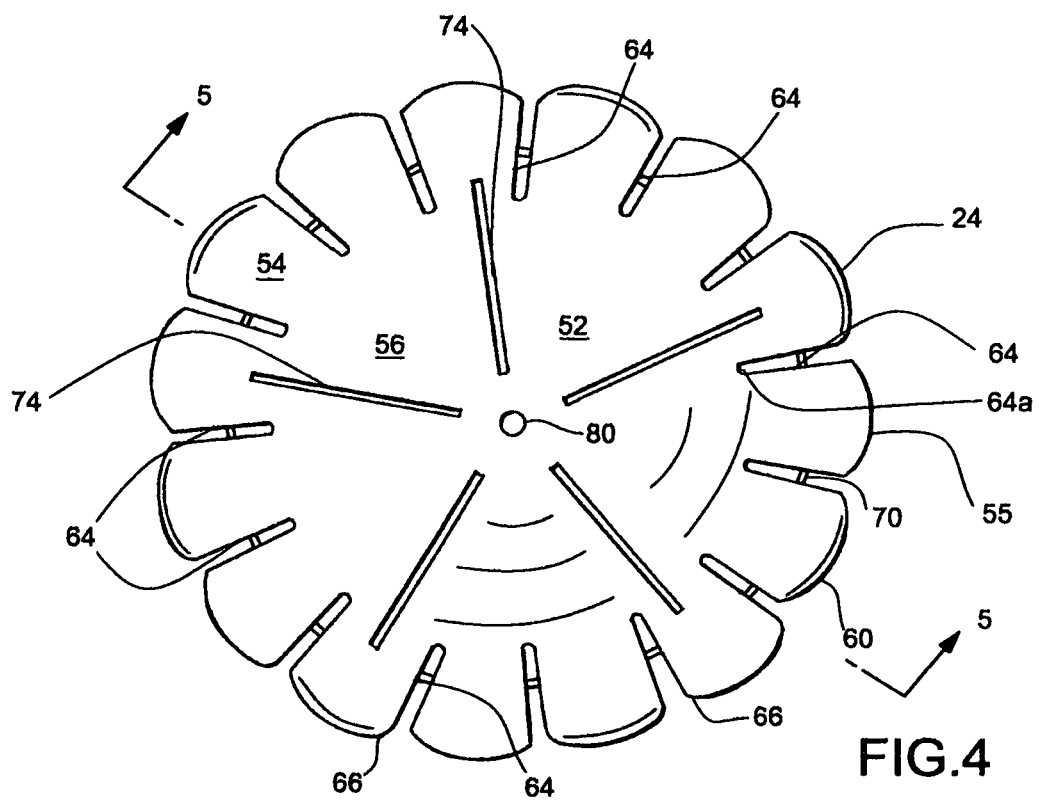
FIG. 4 is a top plan view of the top cover of the FIG. 1 embodiment.

With reference to FIGS. 2 and 3, the base tray 22 includes an upwardly-opening receptacle 28 having a substantially circular opening 30 leading downwardly into the interior, indicated 32, of the receptacle 28. The base tray 22 includes a cylindrical portion 27 which provides cylindrical walls 29 (having upper and lower edges 23 and 25, respectively) adjacent the uppermost section of the receptacle 28 and a bottom 31 which is somewhat dish-like in form in that it tapers downwardly from the lower edges 25 of the cylindrical walls 29 toward a substantially flat central portion 34 thereof. Moreover, the upper edges 23 of the cylindrical portion 27 is bordered by a circular flange 35 which extends radially outwardly of the upper edge 23. In addition, the flange 35 defines an outermost, circular portion 37 (having an upturned lip 82) which is joined to the inwardmost portion 39 of the flanges 35 by way of a plurality of (e.g. twelve) ribs 41. It is the upturned lip 82 of the outermost circular portion 37 which provides a perch upon which hummingbirds can stand.

In addition, the central portion 34 of the base tray 22 includes a hollow protuberance 47 which is joined to so as to extend upwardly from the bottom 31 of the receptacle 28 and includes a central through-opening 48 therein through which the chain 26 can be inserted for suspending the feeder 20 from an overhanging support structure. Furthermore, the bottom 31 of the receptacle 28 is provided with a plurality of drain holes 50 (e.g. three) which are regularly spaced around the protuberance 47 adjacent the base thereof.

With reference again to FIGS. 1, 2 and 4, the top cover 24 has a top portion 55 including a central portion 52 which is surrounded by an outer edge portion 54. The top portion 55 has an upper surface 56 which is dome-shaped in form with the central portion 52 providing the highest point of the surface 56 and the surface 56 sloping downwardly in a gently-sloping arc from the central portion 52 toward the outer edge, indicated 60, of the top cover 24. The upper surface 56 is provided with a plurality of (e.g. fifteen) radially-extending apertures, or V-shaped through-slots 64, which are regularly disposed about the central portion 52. A portion, indicated 64a in FIG. 5, of each of the through-slots 64 which is disposed closest to the apex of the V-shape of the slot 64 provides, as will be apparent herein, a portion of each access vent for the interior 32 of the receptacle 28. Within the depicted feeder 20, the number of through-slots 64 is fifteen, but there can exist an alternative number of through-slots 64.

Figure 5:
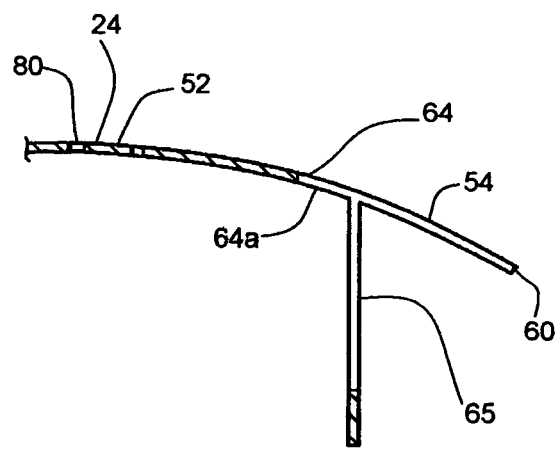
FIG. 5 is a fragment of a cross-sectional view of the top cover taken about along line 5-5 of FIG. 4.

In addition, the outer edge 60 of the top cover 24 is scalloped in form to provide a series of radially-opening V-shaped notches 66 at the openings of the through-slots 64, and the top cover 24 further includes a downwardly-directed cylindrical portion 70 which is joined to the underside, indicated 61 in FIG. 2, of the top portion 55 of the top cover 24 (along a circular path therealong) so as to depend downwardly from the underside 61 to a lower edge 67 of the cylindrical portion 70. Defined about the cylindrical portion 70 are a series of apertures, or through-slots 65, which are each contiguous with a corresponding through-slot 64 of the top portion 55 of the top cover 24, as best shown in FIG. 5. Being contiguous with a corresponding through-slot 64 defined within the top portion 55 of the top cover 24, each through-slot 65 and its corresponding (and contiguous) through-slot 64 collectively provide an access opening for the interior 32 of the receptacle 28 so that the through-slots 64 and 65 provide a plurality of access openings regularly spaced about the top cover 24 through which fruit flies can access the interior 32 of the receptacle 28. In other words, the through-slots 64 and 65 cooperate to provide access vents whose edges are defined, in part, by the edges of the though-slots portions 64a and, in part, by the edges of the through-slots 65.

When the top cover 24 is properly positioned upon the base tray 22 for use of the feeder 20, the cylindrical walls 29 of the receptacle 28 accept the (circular-shaped) lower edge 67 of the cylindrical portion 70 of the top cover 24. If desired, the receptacle bottom 31 can be provided with a series of ribs 72 (FIG. 2) adjacent the lower edge of the cylindrical walls 29 upon which the lower edge 67 of the top cover 24 rests when the cover 24 is positioned upon the base tray 22. Accordingly, the cylindrical portion 70 is sized to be nestingly accepted by the cylindrical walls 29 (i.e. is slightly smaller in diameter than that of the cylindrical walls 29) when the cylindrical portion 70 is positioned upon the receptacle 28.

To facilitate the suspension of the feeder 20 with the chain 26, the top cover 24 includes a center opening 80 through which the chain 26 is permitted to pass as it extends between the overhanging support structure and the central through-opening 48 of the protuberance 47 of the base tray 22. The chain 26, when knotted at a point beneath the central through-opening 48 to prevent its passage therethrough, extends upwardly through both the through-opening 48 and the center opening 80 en route to the overhanging support structure so that the weight of the feeder 20 is borne by the chain 26 as the portion of the base tray 22 which borders the central through-opening 48 rests upon the knot formed in the chain 26. As the top cover 24 is lifted from the base tray 22 to access the receptacle interior 32 or replaced upon the base tray 22, the top cover 24 is permitted to move upwardly or downwardly relative to the base tray 22 as the top cover 24 slides upwardly or downwardly along the chain 26.

Each of the aforedescribed base tray 22 and top cover 24 can be constructed (e.g. molded) as a single, unitary piece out of a relatively hard plastic material, but other materials can be used. If desired, the top cover 24 can be provided with a plurality of (e.g. five) strengthening ribs 74 (FIG. 4) formed therein so as to extend radially of the surface 56 of the top portion 55 thereof.

While the description above contemplates a substantially cylindrically-shaped assembly comprised of the top cover 24 and base tray 22, other embodiments of the feeder could include rectangular or polygonal-shaped components such that the overall shape of the feeder 20 varies according to other desirable configurations. For example, the sides of the feeder 20 could be flat and somewhat rectangular in shape. Similarly, the base tray 22, when viewed in plan view, could be substantially rectangular or possess an alternative polygonal shape.

Furthermore, while the through-slots 64 and 65 of the feeder 20 are depicted within FIGS. 1-4 as being substantially elongate in shape, it is also understood that the apertures provided by the through slots 64 and 65 can be provided with alternative shapes for allowing a fruit fly to enter or exit the interior 32 of the receptacle 28. For example, the apertures 64 or 64 can possess a cross section which is circular in shape, rectangular in shape or possess any of a number of alternative shapes. In another embodiment of the feeder 20, the cylindrical portion 70 can be at least partially formed of a mesh material which is sized to allow fruit flies to enter and exit the interior 32 of the receptacle 28 while discouraging or preventing appreciably larger insects, such as bees, from entering the receptacle 28.

The apertures 64 and 65, whether shaped as elongate slots or shaped to possess an alternative form are preferably sized and shaped to allow fruit flies to enter and exit the feeder 20 and to further allow the beak of a hummingbird to extend into the receptacle 28 to reach fruit flies present within the feeder 20. For this purpose, the through slots 64 and 65 possesses a width of between about $1/16$ inches and $1/4$ inches, and preferably possesses a width (as measured horizontally across the apertures 64 or 65) of about $1/8$ inches so that the width of the through-slots 64 and 65 approximates the width of an adult fruit fly. Further still and while the through slots 64 and 65 allow the beak of a hummingbird to be extended into the feeder 20, the slots 64 and 65 are preferably configured to prevent the beak of a hummingbird from reaching the fruit fly-attracting food placed within the receptacle 28 so that a hummingbird present at the feeder 20 can only feed on the fruit flies within and around the feeder 20, rather than upon the fruit fly-attracting food disposed therein. In other words, the apertures which are defined about the exterior surface of the feeder 20 are sized and shaped such that the one or more fruit flies which are attracted to the fruit fly-attracting food can enter and exit the feeder 20 and hummingbirds can access the fruit flies present within the feeder 20 while also preventing or discouraging larger insects, such as bees, from consuming the fruit fly-attracting food.

To prepare the feeder 20 for use, the top cover 24 is lifted off of the base tray 22 to, for example, the raised condition with respect to the base tray 22 as depicted in FIG. 2, thus exposing the interior 32 of the receptacle 28 to the user. Fruit fly-attracting food, such as banana peels or other fruit, is then placed into the receptacle interior 32, and then the top cover 24 is replaced upon the base tray 22.

Fruit flies can fly about the feeder 20 and gain access to the foodstuff contained within the receptacle 28 by way of the through-slots 64 and 65. Inside the receptacle, the fruit flies lay their eggs, and the eggs subsequently hatch yielding more fruit flies. The fruit flies can thereafter fly out of the feeder 20 through the slots 64 or 65 provided in the top cover 24. Once airborne, the fruit flies are caught by the hummingbirds, who can eat about one-hundred and fifty fruit flies per day. The fruit flies provide the hummingbirds with protein, without which hummingbirds will die.

The top cover 24 blocks ants, most variety of bees and squirrels from entering the receptacle 28, and the feeder 20 is preferably bright red in color so that the feeder 20, with the scalloped outer edge 60 of the top cover 24, provides the esthetically-appealing appearance of a flower.

Several exemplary dimensions of the feeder 20 are provided here as follows. The overall height of the feeder 20, when assembled, can be about 5.75 inches; the overall width of each of the top cover 24 and the base tray 22 can be about 10.5 inches; the depth of the receptacle interior 32 can be about 1.875 inches; the width of the receptacle interior 32 can be about 8.5 inches; the protuberance 47 can be about 3.5 inches in height; the height of the top cover 24 can be about 3.25 inches, the width of the cylindrical portion 70 can be about 8.0 inches; and the length of each through-slot 65 is about 2.5 inches, as measured downwardly from the top portion 55.

The feeder 20 disclosed herein has been found to attract and encourage growth of fruit flies on the fruit fly-attracting food within the receptacle 28 of the feeder 20. Hummingbirds are attracted to the feeder 20 as fruit flies multiply within and around the feeder 20. Fruit flies are permitted to exit the receptacle 28 of the feeder 20 through the through-slots 64 and 65 which are positioned adjacent the circular portion 37 of the base tray 22 which provides a perch for the hummingbirds. After landing on the feeder 20, hummingbirds can then eat fruit flies that attempt to exit the feeder 20 through the access vents provided by the through-slots 64 and 65. Furthermore, the shape of the feeder 20 advantageously prevents fruit flies from quickly escaping the feeder 20 to allow additional time for a hummingbird to capture and eat the fruit flies. For example, fruit flies are prevented from quickly exiting the interior of the feeder 20 because of the relatively narrow width of the through-slots 64 and 65. Additionally, the top cover 24 can substantially overhang the circular portion 37 that provides a perch for the hummingbirds, so that the top cover 24 impedes the movement of fruit flies which exit and attempt to fly away from the feeder 20.

Unlike a traditional nectar or water-based hummingbird feeder, the feeder 20 of the present disclosure does not require continuous maintenance in order to prevent a bait from spoiling and thereby causing the hummingbirds to become sick upon injecting the bait. Because the feeder 20 provides fruit flies for hummingbird consumption, the feeder 20 is not dependent upon maintaining the bait in a fresh, unspoiled condition or otherwise ensuring that the bait is not contaminated. However and in the event that the fruit fly-attracting food spoils or otherwise becomes unsuitable for spawning fruit flies, the number of fruit flies at the feeder 20 may be reduced, but the hummingbirds will not likely ingest the fruit fly-attracting food.

It will be understood that numerous modifications and substitutions can be had to the aforedescribed embodiment 20 without departing from the spirit of the invention. Accordingly, the aforedescribed embodiment 20 is intended for the purpose of illustration and not as limitation.

The invention claimed is:

1. A hummingbird feeder comprising:
a base tray including a receptacle having an upwardly-opening interior for holding food which is attractive to fruit flies;
a top cover which is positionable upon the base tray and includes a top portion for covering the upwardly-opening interior of the base tray when the top cover is positioned thereupon and wherein the top portion defines an underside, and the top cover further includes a downwardly-extending portion which extends downwardly from the underside of the top portion; and
at least one aperture defined within the downwardly-extending portion of the top cover,
wherein the at least one aperture is sized to permit a fruit fly to pass therethrough and access fruit fly-attracting food held within the interior of the base tray; wherein the downwardly-extending portion of the top cover has sidewalls which surround and substantially enclose the interior of the base tray about the sides thereof when the top cover is positioned upon the base tray, and the at least one aperture which is defined within the downwardly-extending portion of the top cover is defined within the sidewalls of the downwardly-extending portion;
wherein the at least one aperture is provided by an elongate through-slot which extends substantially vertically along a sidewall of the downwardly-extending portion of the top cover;
wherein the sidewalls of the downwardly-extending portion of the top cover provide the downwardly-extending portion with a substantially cylindrical shape;
wherein the downwardly-extending portion is joined to the underside of the top portion along a substantially circular path, and the top portion further includes at least one through-slot disposed adjacent the circular path along which the downwardly-depending portion is joined to the underside of the top cover so as to provide vent openings for the interior of the base tray; and
wherein the at least one through-slot provided in the top portion is contiguous with the at least one elongate through-slot which extends substantially vertically along a sidewall of the downwardly-extending portion of the top cover so that the at least one through-slot defined in the top portion of the top cover and the at least one through-slot defined along the downwardly-extending portion of the top cover cooperate to provide a single vent opening for the interior of the base tray.

2. The feeder as defined in claim 1 wherein the at least one aperture has a width as measured horizontally thereacross which is within the range of between about 1/16 inches and 1/4 inches.

3. The feeder as defined in claim 2 wherein the width of the at least one aperture is about 1/8 inches.

4. The feeder as defined in claim 1 wherein the upwardly-opening interior of the base tray is shaped to nestingly accept the downwardly-extending portion of the top cover so that when the feeder is assembled for use, the top cover is captured by the base tray.

5. The feeder as defined in claim 4 wherein the base tray includes a bottom and a hollow protuberance which is positioned substantially centrally of the bottom so as to extend upwardly therefrom, and the hollow protuberance defines a central through-opening therein, and the top portion of the top cover defines an opening disposed substantially centrally of the top cover and which is positioned in substantially vertical registry with the central through-opening of the hollow protuberance when the top cover is positioned upon the base tray for use of the feeder, and the central through-opening of the hollow protuberance and the opening of the top cover facilitate the suspension of the feeder from an overhanging support structure.

6. The feeder as defined in claim 1 wherein the top portion has a central portion and an outer edge portion which surrounds the central portion, and the top portion is substantially dome-shaped so that the central portion thereof is higher than the outer edge portion thereof.

7. A hummingbird feeder comprising:
a base tray including a receptacle having an upwardly-opening interior for holding food which is attractive to fruit flies and having an opening through which the food is placed into the interior of the receptacle, the receptacle having a bottom, and the upwardly-opening interior of the receptacle is bordered by walls which extend upwardly from the bottom and defines an upper horizontal edge which surrounds the receptacle interior; and a top cover having a top portion which is positionable upon the base tray for covering the opening of the receptacle interior when the top cover is positioned upon the base tray and having a portion which extends downwardly from the underside of the top portion, the downwardly-extending portion including an upper edge and a lower edge wherein the upper edge of the downwardly-extending portion is joined to the top portion so that the lower edge extends downwardly therefrom, and the downwardly-extending portion is sized to be accepted by the upwardly-extending walls of the base tray so that when the top cover is positioned upon the base tray for covering the upwardly-opening interior of the receptacle, the downwardly-extending portion of the top cover is accepted by the upwardly-extending walls of the base tray and the lower edge of the downwardly-extending portion rests upon the bottom of the receptacle; and the downwardly-extending portion of the base tray defines a plurality of apertures which provide access to the interior of the base tray, and each of the plurality of apertures is sized to permit a fruit fly to pass therethrough for accessing fruit fly-attracting food held within the interior of the base tray; wherein the downwardly-extending portion of the top cover has sidewalls which surround and substantially enclose the interior of the base tray about the sides thereof when the top cover is positioned upon the base tray, and the plurality of apertures which are defined within the downwardly-extending portion of the top cover are defined within the sidewalls of the downwardly-extending portion;

wherein each of the plurality of apertures is provided by an elongate through-slot which extends substantially vertically along a sidewall;

wherein the sidewalls of the downwardly-extending portion of the top cover provide the downwardly-extending portion with a substantially cylindrical shape, and the elongate through-slots are disposed about the cylindrical sidewalls;

wherein the downwardly-extending portion is joined to the underside of the top portion along a substantially circular path, and the top portion further includes a series of through-slots adjacent the circular path along which the downwardly-depending portion is joined to the underside of the top cover so as to provide vent openings for the interior of the base tray; and wherein each through-slot provided in the top portion is contiguous with a corresponding elongate through-slot which extends substantially vertically along a sidewall of the downwardly-extending portion of the top cover so that each through-slot defined in the top portion of the top cover and the corresponding through-slot defined along the downwardly-extending portion of the top cover cooperate to provide a single vent opening for the interior of the base tray.

8. The feeder as defined in claim 7 wherein the width of each of the plurality of apertures as measured horizontally across each aperture is within the range of between about 1/16 inches and 1/4 inches.

9. The feeder as defined in claim 8 wherein the width of each of the plurality of apertures is about 1/8 inches.

10. A hummingbird feeder comprising:

a base tray including a receptacle having an upwardly-opening interior for holding food which is attractive to fruit flies and having a substantially circular opening through which the food is placed into the interior of the receptacle, the receptacle having a bottom which is substantially dish-like in form, and the upwardly-opening interior of the receptacle is bordered by cylindrical walls which extend upwardly from the bottom and defines an upper horizontal edge which encircles the receptacle interior; and a top cover having a top portion which is positionable upon the base tray for covering the substantially circular opening of the receptacle interior wherein the top portion defines an underside, and the top cover further includes a cylindrical portion which extends downwardly from the underside of the top portion, the cylindrical portion including an upper edge and a lower edge wherein the upper edge of the cylindrical portion is joined to the top portion so that the lower edge extends downwardly from the top portion, and the cylindrical portion is sized to be accepted by the cylindrical walls of the base tray so that when the top cover is positioned upon the base tray for covering the substantially circular opening of the receptacle, the cylindrical portion of the top cover is accepted by the substantially circular opening and the lower edge of the cylindrical portion rests upon the bottom of the receptacle; and the cylindrical portion of the top cover defines a plurality of apertures disposed thereabout, and each of the plurality of apertures has a width as measured horizontally thereacross which is within the range of between about 1/16 inches and 1/4 inches so as to permit a fruit fly to pass therethrough yet prevent an insect which is appreciably larger than a fruit fly from passing through the aperture; wherein the top portion has an outer edge and the top cover defines a series of through-slots which extend radially outwardly of the top portion from locations adjacent the outer edge thereof and downwardly along the cylindrical portion from the upper edge thereof and which provide a hummingbird with access to the receptacle interior.

11. The feeder as defined in claim 10 further comprising an upturned lip which is associated with the upper horizontal edge of the receptacle for providing a perch upon which a hummingbird can rest.

* * * * *